Patented June 28, 1938

2,121,793

UNITED STATES PATENT OFFICE 2,121,793

ABSORBENTS FOR HYDROGEN SULPHIDE

John C. Goshorn and Paul O. Rockwell, Baltimore, Md.

No Drawing. Application July 1, 1935, Serial No. 29,370

22 Claims. (Cl. 23—4)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to compositions for purifying air and oxygen-containing gases mixed with hydrogen sulphide, similar easily oxidizable hydrides, acid fumes, and organic vapors. The compositions are particularly intended for completely removing hydrogen sulphide from air. Charcoal, metallic oxides, and solutions of various acid and alkaline salts have been proposed for the purification of gases containing hydrogen sulphide and acid gases. Many of these purifying agents are heated in order to promote the reaction. Granular metal oxides and iodine compounds have also been used in gas masks for the oxidation of carbon monoxide.

Among the objects of this invention is to provide adsorbents such as activated charcoal impregnated with reagents to increase their absorptive power at ordinary temperatures.

Another object of this invention is to provide absorbents for gas masks which will absorb hydrogen sulphide, gases containing oxidizable hydrogen, and noxious gases.

Another object of this invention is to increase the power of activated charcoal to semi-catalytically oxidize gases in air or an oxygen-containing atmosphere so as to increase its usefulness as a gas purifying agent.

Another object of this invention is to provide a single agent for the substantially complete absorption of hydrogen sulphide and organic vapors from air or oxygen-containing gases.

Active charcoal has the power of absorbing both oxygen and hydrogen sulphide from the air and forming sulphur and water. In order to remove all the hydrogen sulphide at the air velocities used in gas masks, it is necessary to increase the temperature of the charcoal and air above normal, or provide an excessively large volume of 8 to 14 mesh active carbon. The reagents which we propose using have the property of aiding the reaction at normal temperatures, probably because they react in air to form unstable compounds or they increase the ease of oxidation of the sulphide. With the iodine compounds, iodine may be formed in the carbon and take part in the reaction. These reagents are used as impregnants in active charcoal:

(1) Inorganic compounds of nonmetals such as iodine and arsenic, especially in the form of arsenic, iodic, and hydriodic acids and their salts, and particularly those which are water soluble. Also free iodine alone.

(2) Combinations of iodine, iodides and arsenates with alkaline or acid substances, particularly if the added acid or basic reagents are oxidizing reagents. Specifically, combinations such as copper oxide with iodine or potassium iodide, sulphuric acid with potassium iodide, arsenic acid with iodine or ferric nitrate with potassium iodide. The copper oxide is typical of certain metal oxides which are very reactive.

(3) Dry nonvolatile, alkali-metal hydroxides.

The preferred compounds for use as impregnants in active charcoal to absorb hydrogen sulphide are iodine, the iodides, iodates, arsenates and arsenites, as for example the sodium, potassium and ammonium salts. Other metal iodides, such as iron, zinc, copper, and lead, have also been found to increase the absorption of hydrogen sulphide. Impregnating solutions of 2 to 10% are satisfactory for depositing enough reagent to give a marked increase in the absorption except that a strength of 5 to 10% is preferred for the denser carbons. The impregnated charcoal may be made by soaking the activated charcoal in a solution, draining a few minutes, and drying. The iodides are ordinarily heated at about 75° to 85° C. for several hours to remove the water and to form free iodine in the carbon. Other iodine and arsenic compounds are dried at about 40° to 50° C. A water content of 1 to 3% is preferred as this maintains the absorptive power of the carbon and also assists in the absorption of organic vapors. However we may use carbon with moisture content increased after drying, for example 10% moisture.

Iodine may also be impregnated into the carbon by mixing finely powdered iodine with the carbon and heating at about 100° C. for 2 hours in a closed container.

It is also advantageous to impregnate both metal iodides and free iodine as the combination is superior to either reagent alone in the charcoal. Moreover, the action of the iodine compounds depends on the chemical instability of certain iodine compounds which may result in the formation of free iodine in the charcoal. Accordingly, inorganic or organic compounds of iodine which form a substantial amount of free iodine by heating in air at about 80° C. or slightly less are useful in improving the absorptive character of the charcoal. We do not use the organic iodine compounds of the type which form small amounts of iodine at a slow rate.

The alkali metal hydroxides are impregnated into the carbon by soaking, draining, and drying in vacuo to about 2% water. The amount usually added is 5 to 10%.

The character of the charcoal has been found to exert a marked influence on the amount of hydrogen sulphide capable of being absorbed. Activated charcoals are graded commercially according to their absorptive power for organic vapors such as carbon tetrachloride or chlorpicrin. It has generally been accepted that the charcoals which have higher adsorptive power for chlorpicrin are superior adsorbents after impregnation for general use. Contrary to this, however, we have found that the carbon tetrachloride or chlorpicrin tests do not provide the most satisfactory basis of selection of charcoals to be used in the impregnated state for hydrogen sulphide absorption in accordance with our invention. Some impregnated charcoals absorb much less hydrogen sulphide than other carbons of equal adsorptive power (as measured for example by the accelerated chlorpicrin activity) and similarly impregnated. For example, some charcoals of 20 to 30-minute life on the accelerated chlorpicrin test are distinctly superior to others of 40 to 50-minute life. Even certain types of charcoals of the 10-minute accelerated chlorpicrin grade have given excellent results. In selecting charcoal for impregnation in accordance with our invention, the apparent density or the block density is an excellent guide in collaboration with the accelerated chlorpicrin tests or the heat of wetting in benzene. In general, we prefer to use active charcoals of medium or low apparent density as for example 0.25 to 0.45 on the 12–16 U. S. standard size. Thus we prefer to use a 25-minute charcoal of .35 density rather than a 50-minute charcoal density exceeding 0.55.

No particular advantage in hydrogen sulphide absorption in the use of the lower density charcoals in gas mask canisters has been found when commercial activated charcoals are not impregnated. But on impregnation with alkaline reagents which react with hydrogen sulphide, the absorption is greatly improved (5 to 15 fold). For charcoals of the same chlorpicrin activity, this improvement is larger with moderate and low density charcoals than with those of high density.

More striking perhaps is the observation that by using charcoals of low density (0.19 to 0.4) we obtained as good or better hydrogen sulphide absorption with about 25-min. carbons than with 45-min. charcoals of density exceeding 0.5, when both types were impregnated with equal amounts of caustic and dried to 1 to 2% water content.

Some charcoals such as those of high density to be impregnated with iodide or acid oxide can often be improved by soaking the charcoal for a few minutes in a solution containing up to about 1% nitric or sulphuric acid, draining, drying at 150°, or higher, to drive off the acid and then impregnating in a 5% solution of potassium iodide, draining, and drying at 70° to 85°. Nitric acid is preferred. Alternatively the nitric acid impregnated charcoal may be impregnated with potassium iodide and dried at 70 to 85° C. This leaves some acid in the charcoal which not only improves the hydrogen sulphide absorption, but will also serve to increase the protection against ammonia.

The packing of the tubes for measuring the apparent density and the measurement of the chlorpicrin life is described in the Journal of Industrial and Engineering Chemistry, vol. 11, pp. 520-524.

The density tests should be made on granules which are roughly spherical, as the object is to measure differences in the porosity of the granules and not differences in packing due to differences in shape. The density and chlorpicrin test values are on charcoal dried at 150° C. without impregnation.

In a specific embodiment of the invention charcoal of 0.3 to 0.4 apparent density and about 30 minute chlorpicrin activity is soaked in a 10% solution of sodium arsenate containing a slight excess of caustic. The excess solution is drained off and the charcoal dried to less than 5% water content at about 60° C. in an air drier for 16 hours. The low water content is used to assist the absorption of stable organic vapors, 350 cc. of 8–16 U. S. standard mesh on a canister test against 5000 parts per million of hydrogen sulphide in air flowing at 32. l./min. completely absorbed the hydrogen sulphide for 50 to 100 minutes as against 5 minutes for the same unimpregnated active charcoal. The alkali arsenite has shown approximately the same absorption as the arsenate. Active charcoal impregnated with 5% sodium iodide or 5% ammonium iodate has protected for 50 to over 100 minutes on the same test.

In another embodiment, charcoal of 0.3 to 0.4 apparent density and 35 minutes chlorpicrin activity is soaked in a 5% solution of sodium hydroxide, drained and dried in a vacuum drier to a water content of 1 to 3%. If organic vapors are not present with hydrogen sulphide, a caustic content of 10% or a charcoal of low density is used. In all cases, however, it is the intention to so impregnate the carbon as to retain a considerable proportion of its original gas adsorptive power.

Non-metal hydrides having an oxidizable hydrogen include the hydrides of arsenic and sulphur, in which the hydogen is oxidized at room temperature by a weak aqueous solution of an oxidizing agent.

By a water soluble compound, we mean one having a solubility in excess of 3% at 25° C. By dry charcoal we mean one which is substantially dry, for example, less than 3% water content.

While we prefer to impregnate the reagents enumerated above in activated charcoal of the most suitable density, we do not desire to be limited to these reagents in our discovery of the advantage for hydrogen sulphide absorption of selecting activated carbon of about 0.2 to 0.5 apparent density and moderate chlorpicrin activity, as for example 25 to 40 min. On the other hand the chlorpicrin activity of the carbon should exceed 10 min. and preferably be at least 20 min.

When active charcoal is used as the carrier, we are limited as to the concentration against which protection can be afforded because active charcoal can be ignited by the heat of oxidation of hydrogen sulphide. At rapid breathing rates such as 32 l./min. concentrations of 1% by volume are satisfactorily absorbed. A concentration of 2% may ignite the charcoal at the stated air gas velocity, though ignition of the carbon by a 2% concentration at markedly lower velocities would not occur because the heat evolution would be correspondingly reduced.

While we have described the preferred embodiments of our invention, we wish it to be understood that we do not confine ourselves to the precise details herein set forth by way of illustration as it is apparent that many changes and variations may be made therein by those skilled in the art without departing from the spirit of the invention or exceeding the scope of the appended claims.

We claim:

1. A process for the complete purification of air mixed with inorganic gaseous non-metal hydrides which contain oxidizable hydrogen, which consists of contacting said air with activated charcoal impregnated with an inorganic compound of iodine.

2. A process for the complete purification of air mixed with hydrogen sulphide which consists of contacting said air with activated charcoal impregnated with an inorganic compound of iodine.

3. A process for the complete purification of air mixed with hydrogen sulphide which consists of contacting said air with activated charcoal impregnated with a compound of iodine which forms a substantial amount of free iodine by heating in air at less than 80° C.

4. A process for the complete purification of air containing hydrogen sulphide which consists of contacting said air with activated charcoal impregnated with an inorganic salt of iodine, the water solubility of which is at least 3% at 25° C.

5. A process for the complete purification of air containing hydrogen sulphide which consists of contacting said air with an activated charcoal impregnated with a metal salt of hydriodic acid.

6. A process for the complete purification of air containing hydrogen sulphide which consists of contacting said air with an activated charcoal impregnated with an alkali metal iodide.

7. A process for the complete purification of air containing hydrogen sulphide which consists of contacting said air with an activated charcoal impregnated with a metal iodide and iodine.

8. A process for the complete purification of air containing hydrogen sulphide which consists of contacting said air with an activated charcoal impregnated with an alkali metal iodide and iodine.

9. A process for the complete purification of air containing hydrogen sulphide which consists of contacting said air with an activated charcoal impregnated with iodine.

10. A process for the complete purification of air containing hydrogen sulphide which consists of contacting said air with activated charcoal impregnated with an inorganic compound including iodine and oxygen.

11. A process for the complete purification of air containing hydrogen sulphide which consists of contacting said air with activated charcoal impregnated with an inorganic salt of iodic acid.

12. A process for the complete purification of air containing hydrogen sulphide which consists of contacting said air with activated charcoal impregnated with a metal salt of iodic acid.

13. A filter for the complete purification of air to be breathed containing toxic gases, including hydrogen sulphide, consisting of activated charcoal impregnated with a metal salt of hydriodic acid.

14. A filter for the complete purification of air to be breathed containing toxic gases, including hydrogen sulphide, consisting of activated charcoal impregnated with a metal salt of hydriodic acid and iodine.

15. A filter for the complete purification of air to be breathed containing toxic gases, including hydrogen sulphide, consisting of activated charcoal impregnated with an alkali metal iodide.

16. A filter for the complete purification of air to be breathed containing toxic gases, including hydrogen sulphide, consisting of activated charcoal impregnated with an alkali metal iodide and iodine.

17. A process for the purification of air mixed with gaseous, hydrogen sulphide, which comprises contacting said air with dry activated charcoal of 0.18 to 0.5 apparent density and 10 to 45 minute chlorpicrin activity impregnated with an inorganic compound of iodine.

18. A process for the purification of air mixed with gaseous, hydrogen sulphide, which comprises contacting said air with dry activated charcoal of 0.18 to 0.5 apparent density and 10 to 45 minute chlorpicrin activity impregnated with a compound of iodine which forms free iodine by heating in air at less than 80° C.

19. A process for the purification of air containing hydrogen sulphide, which comprises contacting said air with dry activated charcoal impregnated with a metallic salt of hydriodic acid.

20. A process for the purification of air containing hydrogen sulphide, which comprises contacting said air with dry activated charcoal impregnated with an alkali metal iodide.

21. A process for the purification of air containing hydrogen sulphide, which comprises contacting said air with dry activated charcoal of 0.18 to 0.5 apparent density and 10 to 45 minute chlorpicrin activity impregnated with iodine and a metal iodide.

22. A process for the purification of air containing hydrogen sulphide, consisting of contacting said air with dry activated charcoal of 0.18 to 0.5 apparent density and 10 to 45 minute chlorpicrin activity impregnated with a compound of iodine and oxygen.

JOHN C. GOSHORN.
PAUL O. ROCKWELL.